US007020661B1

(12) United States Patent
Cruanes et al.

(10) Patent No.: US 7,020,661 B1
(45) Date of Patent: Mar. 28, 2006

(54) TECHNIQUES FOR PRUNING A DATA OBJECT DURING OPERATIONS THAT JOIN MULTIPLE DATA OBJECTS

(75) Inventors: Thierry Cruanes, Redwood City, CA (US); Mohamed Zait, Sunnyvale, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 442 days.

(21) Appl. No.: 10/193,620

(22) Filed: Jul. 10, 2002

(51) Int. Cl.
*G06F 17/30* (2006.01)

(52) U.S. Cl. .................. 707/103 R; 707/100; 707/101; 707/102; 707/104.1

(58) Field of Classification Search .............. 707/2, 707/3, 4, 102, 104.1, 205, 206, 100, 101, 707/103 R; 30/249, 371; 706/12
See application file for complete search history.

(56) References Cited

U.S. PATENT DOCUMENTS

| 5,319,856 | A | * | 6/1994 | Kolehmainen ............... 30/371 |
| 5,675,791 | A | * | 10/1997 | Bhide et al. ................. 707/205 |
| 5,884,320 | A | * | 3/1999 | Agrawal et al. .......... 707/104.1 |
| 5,970,495 | A | * | 10/1999 | Baru et al. ................... 707/102 |
| 5,983,215 | A | * | 11/1999 | Ross et al. ....................... 707/2 |
| 6,003,036 | A | * | 12/1999 | Martin ......................... 707/102 |
| 6,092,062 | A | * | 7/2000 | Lohman et al. ................. 707/2 |
| 6,112,198 | A | * | 8/2000 | Lohman et al. ................. 707/3 |
| 6,223,182 | B1 | * | 4/2001 | Agarwal et al. ............ 707/102 |
| 6,230,151 | B1 | * | 5/2001 | Agrawal et al. ............... 706/12 |
| 6,240,428 | B1 | * | 5/2001 | Yeung et al. ................ 707/206 |
| 6,263,331 | B1 | * | 7/2001 | Liu et al. ......................... 707/4 |
| 6,609,131 | B1 | * | 8/2003 | Zait et al. .................... 707/102 |
| 6,665,684 | B1 | * | 12/2003 | Zait et al. .................... 707/102 |
| 6,694,621 | B1 | * | 2/2004 | Boley et al. .................. 30/249 |
| 6,920,460 | B1 | * | 7/2005 | Srinivasan et al. ......... 707/102 |

OTHER PUBLICATIONS

U.S. Appl. No. 09/795,904, filed Feb. 27, 2001, entitled "Method and Mechanism for Partition Pruning," by Hakan Jakobsson et al., 50 pages.
U.S. Appl. No. 09/796,001, filed Feb. 27, 2001, entitled "Method and Mechanism for Database Partitioning," by Mohamed Zait et al., 48 pages.

* cited by examiner

*Primary Examiner*—Frantz Coby
(74) *Attorney, Agent, or Firm*—Hickman Palermo Truong & Becker LLP

(57) ABSTRACT

Techniques for eliminating one or more portions of a data object from any join step of an operation that joins multiple data objects include determining that an operation joins a first data object and a second data object. The second data object includes multiple portions. Each of multiple data units of the first data object is scanned. Based on data in the data units of the first data object, information is generated. The information indicates a portion of the second data object for exclusion. The indicated portion is excluded from an output of the operation. Only one or more portions of the second data object that are not indicated for exclusion in the information are included in a particular join step involving the second data object. By pruning a large second table, such as a fact table, the computational resources consumed by the joins are substantially reduced.

38 Claims, 6 Drawing Sheets

FIG. 1A

110 STORES TABLE

| 111 STORE_ID COLUMN | 113 STREET COLUMN | 115 CITY COLUMN | 117 STATE COLUMN | 119 MGR_ID COLUMN | |
|---|---|---|---|---|---|
| 23 | 1010 MAIN | SAN JOSE | CA | 111 | 112a ROW |
| | | | | | 116 |
| 432 | 16 PINE | FAIRFAX | IN | 6465 | 112b ROW |

114 •••

120 PRODUCTS TABLE

| 121 PROD_ID COLUMN | 123 SOURCE COLUMN | 127 COST COLUMN | 129 CATEGORY COLUMN | |
|---|---|---|---|---|
| 117 | ABC CO. | $70 | MEMORY | 122a ROW |
| | | | | 126 |
| 589 | ZZ CORP. | $40 | MODEM | 122b ROW |

124 •••

140 TIME TABLE

| 141 TIME_ID COLUMN | 143 DATE COLUMN | 145 FISCAL_YR COLUMN | 147 FISCAL_QTR COLUMN | |
|---|---|---|---|---|
| 1050 | 11/15/01 | 2002 | Q1 | 142a ROW |
| | | | | 146 |
| 1082 | 12/17/01 | 2002 | Q2 | 142b ROW |

144 •••

US 7,020,661 B1

TECHNIQUES FOR PRUNING A DATA OBJECT DURING OPERATIONS THAT JOIN MULTIPLE DATA OBJECTS

FIELD OF THE INVENTION

The present invention relates to data processing of data objects on a computer system, and, in particular, to improving data processing performance by pruning a large data object during data processing operations that join multiple data objects.

BACKGROUND OF THE INVENTION

Computer systems are typically used to process data represented internally as one or more data objects. Examples of data objects include database objects in a database management system as well as images, audio tracks, flat files, and documents in various storage formats known in the art. Publicly available formats for document storage known in the art include the Hypertext Markup Language (HTML) and the extensible markup language (XML). Some data processing tasks involve operations that combine or "join" data from several data objects. In some circumstances the join can consume considerable computational resources, such as computer memory, processing cycles on a central processing unit (CPU), storage, and communication channel bandwidths. The use of computational resources can sometimes be reduced if one or more portions of a large data object can be eliminated from the join steps of an operation.

A common context in which the consumption of resources during a join step is severe is in a query for data from multiple database tables that are related according to a star schema. A table is a data object that represents data in rows and columns. Each column represents an attribute or field with a certain kind of data that has a particular form or meaning or both. Each row represents a record with a value for each of the columns, although some values may be undefined values indicated by the symbol NULL. In a star schema, a database table with a large number of rows, called a "fact table," contains much of the data in a database, and several database tables with many fewer rows, called "dimension tables," each contain ancillary information about the entries for a corresponding column in the fact table. The entry in the corresponding column of the fact table is the value for a foreign key that uniquely identifies one row in the dimension table associated with that column. The values in other columns of the row in the dimension table provide the ancillary information associated with a key value. A star schema is typically used to avoid repeating information in the dimension tables with every row in the fact table.

For example, a fact table called "Sales" has a row for each sale made by a large retailer of electronic components. The Sales table can be expected to accumulate millions of rows. These many sales are made at relatively few stores. The location, manager, and phone number of the stores are of interest, but it is not desirable to repeat the store street address, city, state, zip code, phone number and manager information of each store for the tens of thousands of sales made at that store. Instead, a unique store identifier (store ID) is defined as a primary key in a column called "stores_id" of a dimension table called "Stores"; and, for each distinct store, a row is added to the Stores table with a unique value in the store_id column. Each row also contains values in other columns that represent street address, city, state, zip code, phone number and manager of the store. The store_id column in the Stores table may be referenced as "Stores.store_id."

In this example, a single foreign key column in the Sales table is defined that holds the value of the store_id for the store where the sale is made. For simplicity of illustration the column is also called "store_id," but may have a different name in other circumstances. The column may be referenced as "Sales.store_id." The data sharing a row in the Stores table with a particular value of the store_id is also associated with every row of the Sales table that has that same value in the Sales.store_id column. The size of the Sales table and Stores table added together is much smaller than the size the Sales table would be if multiple columns describing each store were included in each row of the Sales table; yet the database holds the same amount of information.

A star query joins data from a fact table and one or more of the dimension tables. For example, a query requesting columns from the Sales table and Stores table for sales made in Indiana during July, involves both the information in the Stores table and the information in the Sales table and the information in the Time table. It is a star query that joins tables. A database management system would join the three tables to determine which rows of the Sales table are associated with stores in Indiana and times in July and what values of the Stores table and Time table are associated with each of those rows.

Because there are so many rows in the Sales table, it is desirable to avoid scanning every row of the Sales to respond to this query. It is preferable to identify a subset of the rows of the Sales table and scan only that subset. Because a join step consumes so many resources, it is desirable to avoid joining every row scanned. It is preferable to identify a subset of the rows scanned from the Sales table and involve only that subset in a join with the Stores table.

In one past approach, a join index is generated that identifies rows in the fact table that have a certain value in the dimension table. If a particular join index is generated with the Stores.state column as the index key, the join index can be used to identify rows in the Sales table that have the value of "Indiana." Then the subset of rows can be joined to the Stores table, greatly reducing the consumption of computational resources. A disadvantage of this approach is that it consumes too many computational resources to form a join index for every column used in all possible star queries, and it is hard to predict which subset of columns are included in the criteria that will be used by future star queries. Consequently, there are very likely many queries that do not benefit from a pre-existing join index. It is not a solution to form the join index in response to receiving the particular query, because the resources consumed to form the join index probably exceed the resources consumed to scan the entire Sales table.

In another past approach, the database management system uses partitioning to avoid scanning every row in a table in some circumstance. With partitioning, a data object, such as a table, is divided up into multiple sub-tables referred to as "partitions" that are stored and indexed separately. A row is assigned to one partition or another based on the value of one or more columns that constitute a partitioning key. The database management system transforms the star query to include additional sub-queries on a single table that allow the database management system to avoid scanning any rows in one or more partitions of the Sales table. This approach is described in more detail in a patent application Ser. No. 09/795,904, filed on Feb. 27, 2001, by Hakan Jakobsson, Mohammed Zait and Benoit Dageville, titled "Method and Mechanism for Partition Pruning."

For example, if the Sales table is partitioned with Sales.store_id as the partitioning key, rows for sales in the same store are placed in one partition of the Sales table and rows for each different store are stored in a corresponding different partition. Using this past partition pruning approach, the database management system transforms the star query requesting columns from the Sales table and Stores table for sales made in Indiana. The transformed query includes an additional sub-query to take advantage of the partitioning. The additional sub-query uses the information in one dimension table to avoid adding another join. The sub-query takes the form of selecting from the Stores table only values from the Stores.store_id column where the Stores.state column has a value that indicates "Indiana." This portion of the query can be performed without a join step and produces a list of store_id values for stores in Indiana. A value for the Sales.store_id is then chosen from this list of Stores.store_id values. The database management system recognizes that the Sales table is partitioned by Sales.store_id; and, the database management system forms an execution plan that only scans the partitions corresponding to the chosen values of Sales.store_id. In many cases, one or more partitions of the Sales table can be eliminated from the join step of the query execution.

A disadvantage of this approach is that it is often costly to perform the sub-queries, especially where the table is partitioned on multiple keys for multiple dimension tables and multiple sub-queries are involved. If the number or size, or both, of the partitions avoided are not great enough, the extra cost in computational resources to plan and execute the sub-queries exceeds the reduction in cost by avoiding the few partitions.

In another approach, the costs of generating and performing the sub-queries and the benefits of avoiding joins with any partitions are estimated. The database management system does not generate the sub-queries when the cost of doing so is estimated to exceed the benefits. A problem with this approach is that it is difficult to estimate either the costs or benefits of using the sub-queries before the execution of the query. Computational resources are consumed to make the estimates; yet, the estimates are sometimes not accurate and cannot be relied upon in all circumstances.

Based on the problems and disadvantages described above, there is a clear need for techniques that reduce the portions of a data object that are included in joins for operations that involve several data objects.

In particular, there is a need for reducing the number of rows or partitions of a fact table that are joined with dimension tables during the planning and execution of a star query in a database management system.

The past approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

Techniques are provided for eliminating one or more portions of a data object from any join step of an operation that joins multiple data objects. The techniques include determining that an operation joins a first data object and a second data object. The second data object includes multiple portions. Each of multiple data units of the first data object is scanned. Based on data in the data units of the first data object, information is generated. The information indicates a portion of the second data object for exclusion from an output of the operation. Only one or more portions of the second data object that are not indicated for exclusion in the information are included in a particular join step involving the second data object.

By pruning a large second data object, such as a fact table, the number of data units, such as rows, involved in a join is greatly reduced from a number involved without such pruning. As a consequence, the computational resources consumed by the join are substantially reduced. In many cases, the number of data units involved in subsequent joins is also greatly reduced; thereby also substantially reducing the computational resources consumed by the subsequent joins. In addition, no estimation need be attempted; and, therefore, no costs of computing the estimate and no costs due to errors in estimation are incurred.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates example dimension tables in a database, according to an embodiment;

DETAILED DESCRIPTION OF THE PREFERRED EMBODIMENT

Figure 1B:
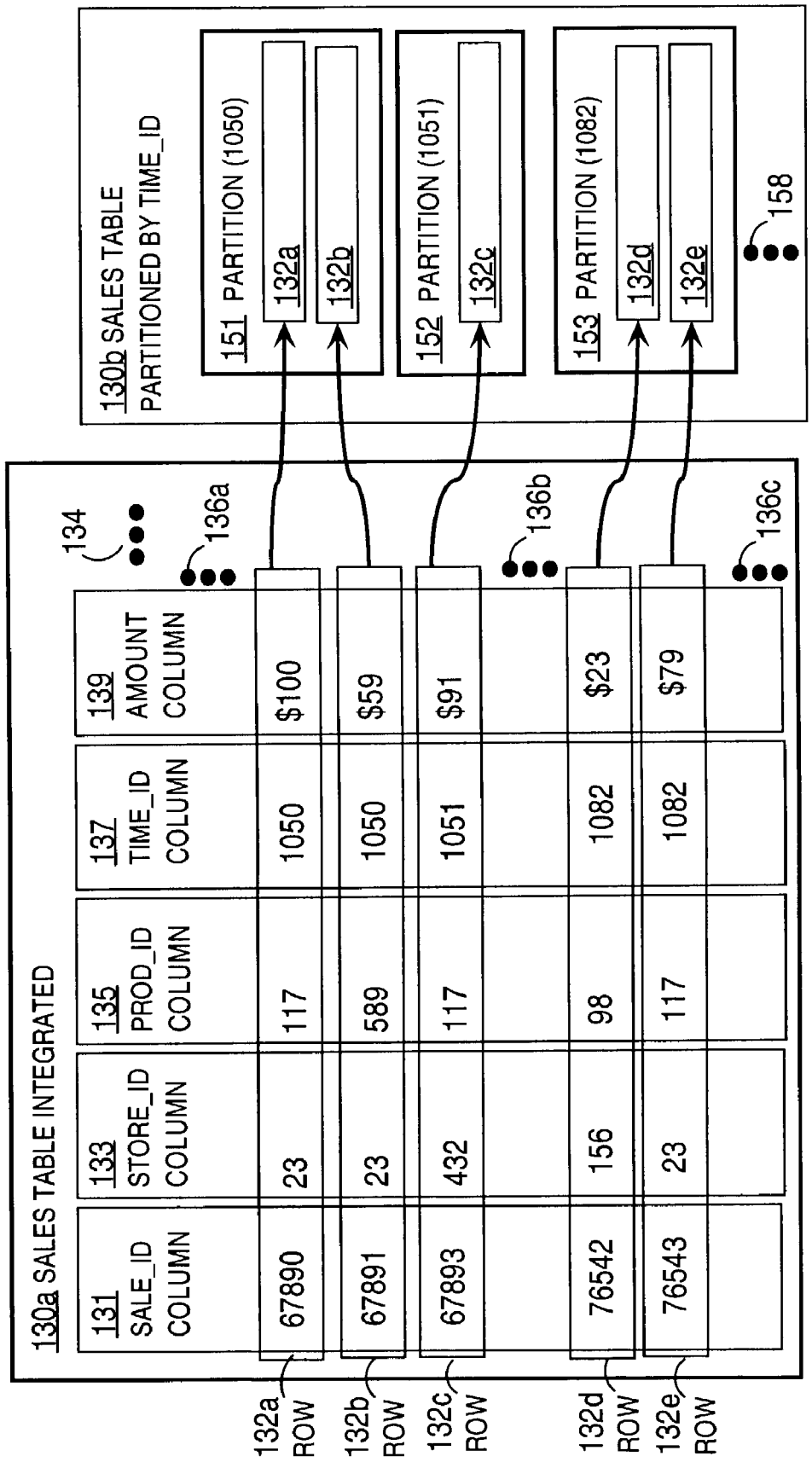
FIG. 1B is a block diagram that illustrates a example partitioned fact table in the database, according to an embodiment.

Techniques for pruning a large data object during operations that join multiple data objects are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

The invention is described herein in the context of star queries on a fact table with multiple dimension tables in a database management system. However, the invention is not limited to this context. Embodiments of the invention may be applied to other operations involving other data objects. For example, embodiments may be used in other database operations. As another example, embodiments may be used in a network server operation that merges data from a large XML document based on data in one or more smaller XML documents to construct an XML resultant document or an HTML document sent as a web page over the network to a client. In the XML context, the XML document is the data object, and a tagged element can be considered a portion of the data object. For example, the element at the top of the hierarchy of elements in a document stored as a file can be considered analogous to a partition of a database table; a tagged element in the hierarchy below the top level that contains other elements can be considered analogous to sub-partitions or data units such as rows of a database table, and a tagged element that does not contain any other elements can be considered a data unit or data item analogous to a row or a field in a row of a database table.

EXAMPLE STAR SCHEMA

For purposes of illustration, it is assumed that an illustrated embodiment applies to an operation involving a fact table called SALES with three dimension tables called, respectively, TIME, STORES, PRODUCTS in a database of an electronics retailer. It is further assumed for purposes of illustration, that the SALES table is partitioned by time_id, a key column in the TIME table, as described below. It is not necessary for the fact table to be partitioned on a key column of a dimension key; the fact table may be partitioned based on any column in any of the dimension tables, based on multiple columns, or not partitioned at all.

FIG. 1A is a block diagram that illustrates example dimension tables 100 in a database, according to an embodiment. A STORES table 110 includes a primary key store_id column 111 for holding values of a unique store identifier (store ID) in each row. The STORES table 110 also includes street column 113, city column 115, state column 117, and mgr_id column 119, for holding in each row values, respectively, of a street address, a city name of a city where the store is located, a state name of a state where the store is located, and an employee identifier (employee ID) for a manager who runs the store. The STORES table 110 includes other columns represented by ellipsis 114 not used to explain the embodiments.

The STORES table 110 includes multiple rows, one row for each unique store belonging to the electronics retailer. A first row 112a and a last row 112b are shown with specific example values in each column. For example, row 112a includes values that indicate the store ID is "23," the street address is "1010 Main," the city is "San Jose," the state is "CA," and the manager has an employee ID of "111" Other intervening rows in STORES table 110, represented by ellipsis 116, are not used to explain the embodiments.

A PRODUCTS table 120 includes a primary key prod_id column 121 for holding values of a unique product identifier (product ID) in each row. The PRODUCTS table 120 also includes source column 123, cost column 127, and category column 129, for holding in each row values, respectively, of a supplier of the product, a cost paid for the product, and a category for the product. The PRODUCTS table 120 includes other columns represented by ellipsis 124 not used to explain the embodiments.

The PRODUCTS table 120 includes multiple rows, one row for each unique product sold by the electronics retailer. A first row 122a and a last row 122b are shown with specific example values in each column. For example, row 122a includes values that indicate the product ID is "117," the supplier is "ABC Co.," the cost is "$70," and the product belongs to a category called "MEMORY" indicating that the product is a memory chip for a computing device. Another category of products, as shown in row 122b, is "MODEM" to indicate that product with product ID 589 is a modem for sending data over telephone lines. Other intervening rows in PRODUCTS table 120, represented by ellipsis 126, are not used to explain the embodiments.

A TIME table 140 includes a primary key time_Id column 141 for holding values of a unique time identifier (time ID) in each row. Each different time ID represents a different day of sales. The TIME table 140 also includes date column 143, fiscal_yr column 145, and fiscal_qtr column 147, for holding in each row values, respectively, of a date, a fiscal year for the retailer associated with that date, and a fiscal quarter for the retailer associated with that date (among fiscal quarters Q1, Q2, Q3, Q4). The TIME table 140 includes other columns represented by ellipsis 144 not used to explain the embodiments.

The TIME table 140 includes multiple rows, one row for each unique date that the electronics retailer sold products. Two rows 142a, 142b are shown with specific example values in each column. For example, row 142a includes values that indicate the time ID is "1050" on the date "Nov. 15, 2001," the fiscal year is "2002," and the fiscal quarter is "Q1." Other intervening rows in TIME table 140, represented by ellipsis 146, are not used to explain the embodiments.

In some embodiments, dimension tables themselves may have dimension tables. For example, an employee table is a dimension table for the STORES table, because the meaning of the mgr_id column is described by the data in the employee table in a row where the value of the employee ID is the same as the value stored in the mgr_id column of the STORES table 110.

FIG. 1B is a block diagram that illustrates an example partitioned fact table 130 in the database, according to an embodiment. Table 130a represents the sales table as viewed without showing the effects of partitioning, such as before the table is partitioned, or in a database view for which partitioning is not important.

A SALES table 130a includes a primary key sale_id column 131 for holding values of a unique sales identifier (sales ID) in each row. The SALES table 130a also includes a store_id column 133, prod_id column 135, time_id column 137, and amount column 139, for holding in each row values, respectively, of a store ID where the sale was made, a product ID of the product sold, a time ID for the date of the sale, and an amount a customer paid for the product during the sale. The SALES table 130a includes other columns represented by ellipsis 134 not used to explain the embodiments.

The SALES table 130a includes multiple rows, one row for each sale made by the electronics retailer. Some rows 132a, 132b, 132c, 132d, 132e are shown with specific example values in each column. For example, row 132a includes values that indicate the sale ID is "67890," the store ID is "23," the product ID is "117," the time ID is "1050," and the amount is "$100." Other rows in SALES table 130a, represented by ellipses 136a, 136b, 136c, are not used to explain the embodiments.

Using the value in the store_id column 133 of the SALES table 130a, a store and characteristics of the store are associated with a row in the SALES table 130a. For example, the sale in row 132a was made at the store having store_id "23," which is described in row 112a of table 110. Therefore, the sale was made in the store at 1010 Main, San Jose, Calif. and is managed by a manager with employee number 111. Similarly, using the value in the prod_id column 135, it can be determined that the sale in row 132a sold a memory chip supplied by ABC Co at a cost of $70. Similarly, using the value in the time_id column 135, it can be determined that the sale in row 132a was made on Nov. 15, 2001, in the first fiscal quarter of fiscal year 2002 for the electronics retailer.

The SALES table 130a is partitioned using the time_id as the partitioning key. In other embodiments one or more other columns of the fact table or the dimension tables or both may be used as the partitioning key or keys. The partitioning can be performed in any manner known in the art. Two common methods to partition a table are range partitioning and hash partitioning. According to range partitioning, each individual partition corresponds to a particular range of values for the partitioning key. According to hash partitioning, the partitioning key is applied to a hash function to produce one hash value among a predefined set of hash values. Each individual partition corresponds to a particular hash value. One or more values of the primary key may be hashed to a particular hash value. In some data processing systems, several partitioning methods can be mixed, using one method for the first partitions and then sub-partitioning one or more of the partitions using another method. The sub-partitions can themselves be partitioned using yet another method or one of the methods already used. For purposes of illustration, only one level of hash partitioning is performed to produce the partitioned SALES table 130b.

The partitioned SALES table 130b, includes several partitions that are stored separately in the database system, one partition for each hashed value produced by applying a hash function to the time_id value. Some partitions 151, 152, 153 are shown with specific rows included. For example, time_id value "1050" hashes to a hash value associated with partition 151; therefore partition 151 includes rows 132a, 132b which have "1050" as their time_id values. Partition 151 may include other rows, not shown, such as other rows with a time_id value of "1050," or rows with other values of time_id that hash to the same hash value associated with partition 151. Time_id value "1051" hashes to a hash value associated with partition 152; therefore partition 152 includes row 132c, which has "1051" as its time_id value. Similarly, partition 152 may include other rows, not shown, such as other rows with a time_id value of "1051," or rows with other values of time_id that hash to the same hash value associated with partition 152. Time_id value "1082" hashes to a hash value associated with partition 153; therefore partition 153 includes rows 132d, 132e which have "1082" as their time_id values. Similarly, partition 153 may include other rows, not shown, such as other rows with a time_id value of "1082," or rows with other values of time_id that hash to the same hash value associated with partition 153. Other partitions in SALES table 130b, represented by ellipses 158, are not used to explain the embodiments.

In the illustrated embodiment, it is desired to perform an operation that includes a join of the SALES table with one or more of its dimension tables, such as a star query, without involving every row or every partition in the SALES table, whenever possible, and that does not suffer from disadvantages of past approaches.

Execution Plan for Example Star Query

In typical database management systems, users store, update and retrieve information by submitting commands to a database server of a database management system (DBMS). To be correctly processed, the commands must comply with the database language that is supported by the database server. One popular database language is known as Structured Query Language (SQL). A command that retrieves data from the database is called a query.

It is assumed for purposes of illustration that an SQL star query (SQ1) of the following form is processed by a database management system.

SELECT s.city, p.source, SUM(f.amount)

FROM SALES f, TIME t, STORES s, PRODUCTS p

WHERE f.store_id=s.store_id AND s.state="CA"

AND f.prod_id=p.prod_id AND p.category="MEMORY"

AND f.time_id=t.time_id

AND t.date BETWEEN "Nov. 13, 2001" AND "Nov. 22, 2001"

GROUP BY s.city, p.source; (SQ1)

The query SQ1 indicates a join because data is selected from four tables listed after the FROM component, the SALES table 130, the TIME table 140, the STORES table 110, and the PRODUCTS table 120. The FROM component also indicates some shorthand aliases for the four tables in the rest of the query, associating the alias "f" (e.g., for "fact") with the SALES table 130, and the aliases "t," "s," "p," respectively, with the TIME table 140, the STORES table 110, and the PRODUCTS table 120. The star query SQ1 indicates that the sum of the sales amount should be computed and listed by city and by product source company for all sales involving MEMORY chips made in California during one particular week in November 2001.

The query SQ1 includes join conditions used to associates a row in each dimension table with each row of the fact table. In the illustrated embodiment, the join conditions are as follows:

f.store_id=s.store_id
AND f.prod_id=p.prod_id
AND f.time_id=t.time_id

One join condition indicates that a row in the STORES table is joined to a row in the fact table only if the value in the store_id column of the s table (STORES table 110) equals the value in the store_id column of the f table (fact table, namely, SALES table 130). One join condition indicates that a row in the PRODUCTS table is joined to a row in the fact table only if the value in the prod_id column of the p table (PRODUCTS table 120) equals the value in the prod_id column of the f table (fact table, namely, SALES table 130). One join condition indicates that a row in the TIME table is joined to a row in the fact table only if the value in the time_id column of the t table (TIME table 140) equals the value in the time_id column of the f table (fact table, namely, SALES table 130).

Using conventional processing, the database system runs an optimizer process ("optimizer") to develop an execution plan for the query SQ1. The optimizer determines how to access the rows in each table, which of several join methods to use, and an order for joining the four tables. For purposes of illustration, it is assumed that no indexes or join indexes have been formed on the SALES table 130 or any of the dimension tables, and that none of the tables are clustered tables, so that access of each table is by full-table scan. For purposes of illustration, it is further assumed that the join method is either a sort-merge join or a hash join. In a star query, the optimizer typically involves the fact table in the first join step.

Figure 2:
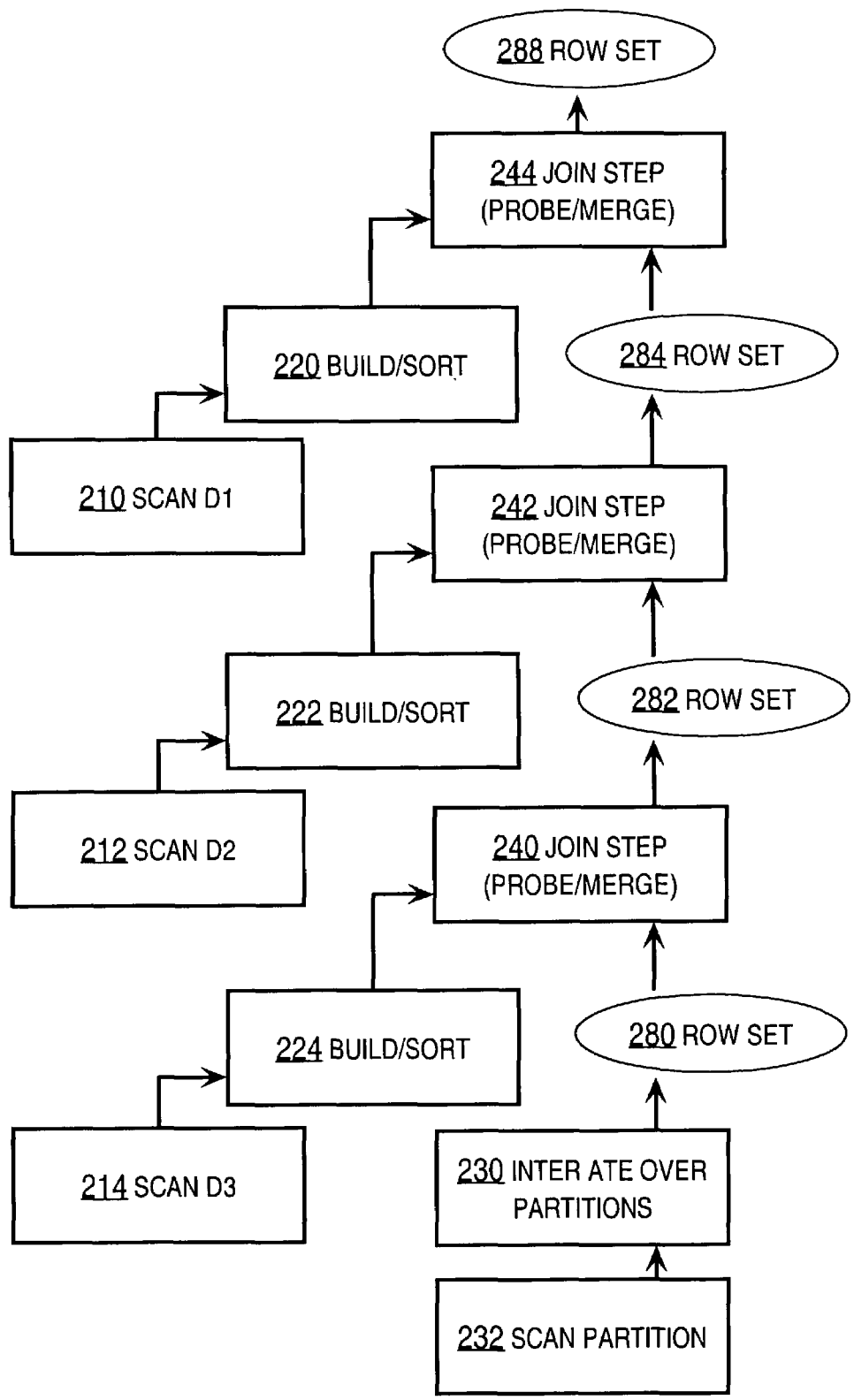
FIG. 2 is a block diagram that illustrates a data flow execution plan for an operation involving joins, according to an embodiment.

An execution plan diagram depicts a combination of steps used by the database management system to process one or more sets of rows. Each step that generates a row is a "row source." The set of rows passed from one step of the execution plan is called herein a "row set." FIG. 2 is a block diagram that illustrates an example data flow execution plan 200 for a star query involving three dimension tables D1, D2, D3. To simplify the following description, the row sets generated by some operations are shown in FIG. 2 as ovals 280, 282, 284, 288. These ovals are not separate steps from the operations that produce them; the ovals are simply abstractions for the output from one operation that is input to another operation. To avoid obscuring the diagram, the row sets from many operations are not represented by ovals.

In typical embodiments the execution plan proceeds from the top of the execution plan to the bottom, and at any one level in the diagram proceeds from left to right. The row sets are "pulled" from the row sources. In such embodiments, the join in step 244 is started first, which starts the build/sort step 220 that starts the scan step 210. When steps 210 and 220 complete, step 242 is started, which starts step 222 that starts step 212. When steps 212 and 222 complete, step 240 is started, which starts step 224 that starts step 214. When steps 214 and 224 complete, step 230 is started, which starts step 232. In other embodiments, other execution orders may be employed.

According to this plan, in step 210 a full table scan is performed on table D1, and the row set produced is passed to step 220.

In step 220, the row set is processed in different ways depending on the type of join. For a sort-merge join, the row set from step 210 is sorted on the columns used in the join condition. For a hash join, the row set is used to build a hash table. During the building of a hash table, the values in the columns used in the join condition of each row in the row set are input to a hash function to yield a hash value that indicates a position in the hash table for that row. The row from the row source is then placed in the hash table at the position indicated by the hash value. The output of step 220 is a new row set either in sorted order, for a sort-merge join, or clustered on the join keys for a hash join.

In step 244, the row set from step 220 is joined with the row set 284 from step 242, depending on the type of join. For a sort-merge join, the row set 284 is sorted on the columns used in the join condition with dimension table D1. After sorting, the next row in row set 284 is compared to the next row in the row set from step 220. If the columns of the join condition are equal, the two rows are joined to generate the next row for row set 288 output by step 244, and the next row from row set 284 is compared. If the columns of the join condition are not equal, and there is no error, the next row of the row set from step 220 is selected and compared to the current row from row set 284.

In step 244 for a hash join, each row from the row set 284 is processed as received. This step is said to probe the hash table. The columns of the row set 284 used in the join condition are input to the hash function to generate a hash value that indicates a position in the hash table. The row at that position of the hash table is combined with the row from row set 284 to generate the next output row for row set 282.

By either join method, when all the rows of row set 284 are processed, step 244 is complete. The row set 288 is then complete for input to subsequent steps associated with the query. In the steps just described, the dimension table D1 is the "outer" table sometimes called the "left-side" table. The row source 242 is the "inner" row source, sometimes called the "right-side" row source. If row source 242 had been a table access, the table accessed would be called the "inner" table, or the "right-side" table.

For three dimension tables, steps analogous to steps 210, 220, 244 and a row set analogous to row set 284 are repeated for the next two dimension tables involved in the joins. For dimension table D2, steps 212, 222, 242 and row set 282 correspond to steps 210, 220, 244 and row set 284 for dimension table D1. Similarly, for dimension table D3, steps 214, 224, 240 and row set 280 correspond to steps 210, 220, 244 and row set 284 for dimension table D1.

The row set 288, output after the join of dimension table D1, is subjected to the steps of the execution plan performed after the join, as determined based on the query and the optimizer. For a partitioned fact table, the row set 280 is generated by iterating over all partitions of the fact table in step 230 and scanning each partition in step 232.

For purposes of illustration, it is assumed that the dimension tables join order determined by the optimizer for the example star query SQ1 is PRODUCTS, STORES, TIME. Thus D3 corresponds to the PRODUCTS table 120, D2 corresponds to the STORES table 110, and D1 corresponds to the TIME table 140.

The execution plan steps are completed first with steps that form leaf nodes in the hierarchical partition plan diagrammed in FIG. 2. Thus steps 210, 212, 214 and 230 are completed before steps 220, 222, 224 and 232, respectively. However, the steps in the leaf nodes can be started and completed independently of each other. In systems that support parallel processing, each leaf node step may be performed simultaneously by one or more slave processes. For similar reasons, steps 220, 222, 224, 232 are completed before steps 244, 242, 240 respectively. However, steps 220, 222, 224, 232 can be performed independently of each other.

In one past approach, the steps of execution plan 200 are modified to include additional steps for the sub-queries generated. According to illustrated embodiments of the invention, those additional queries are not added, and corresponding additional steps are not added to the execution plan 200.

Instead, according to the illustrated embodiments, step 220 (and analogous steps 222, 224) is modified. The modification produces information that is used to exclude rows of the fact table or partitions of the fact table or both. The information is produced from data obtained while building or sorting row sources from a full table scan of a dimension table and is obtained at little extra cost in computational resources. Information to exclude partitions is used in step 230 to iterate over only particular partitions. Information to exclude rows is used in step 232 to filter out particular rows scanned from a partition so that those rows are excluded from row set 280. According to these embodiments, step 230 is not started until steps 220, 222, 224 complete.

As used herein, eliminating one or more partitions in step 230, or eliminating a substantial number of rows in step 232, or both, is called pruning the fact table. By pruning the fact table, the size of row set 280 is greatly reduced from a size without such pruning. As a consequence, the computational resources consumed by the join step 240 is substantially reduced. In many cases, the sizes of row sets 282 and 284 are also substantially reduced; thereby also reducing the computational resources consumed by join steps 242 and 244. In the illustrated embodiments, no estimation is attempted; and, therefore, no costs of computing the estimate and no costs due to errors in estimation are incurred.

Method for Pruning Fact Table

Figure 3:
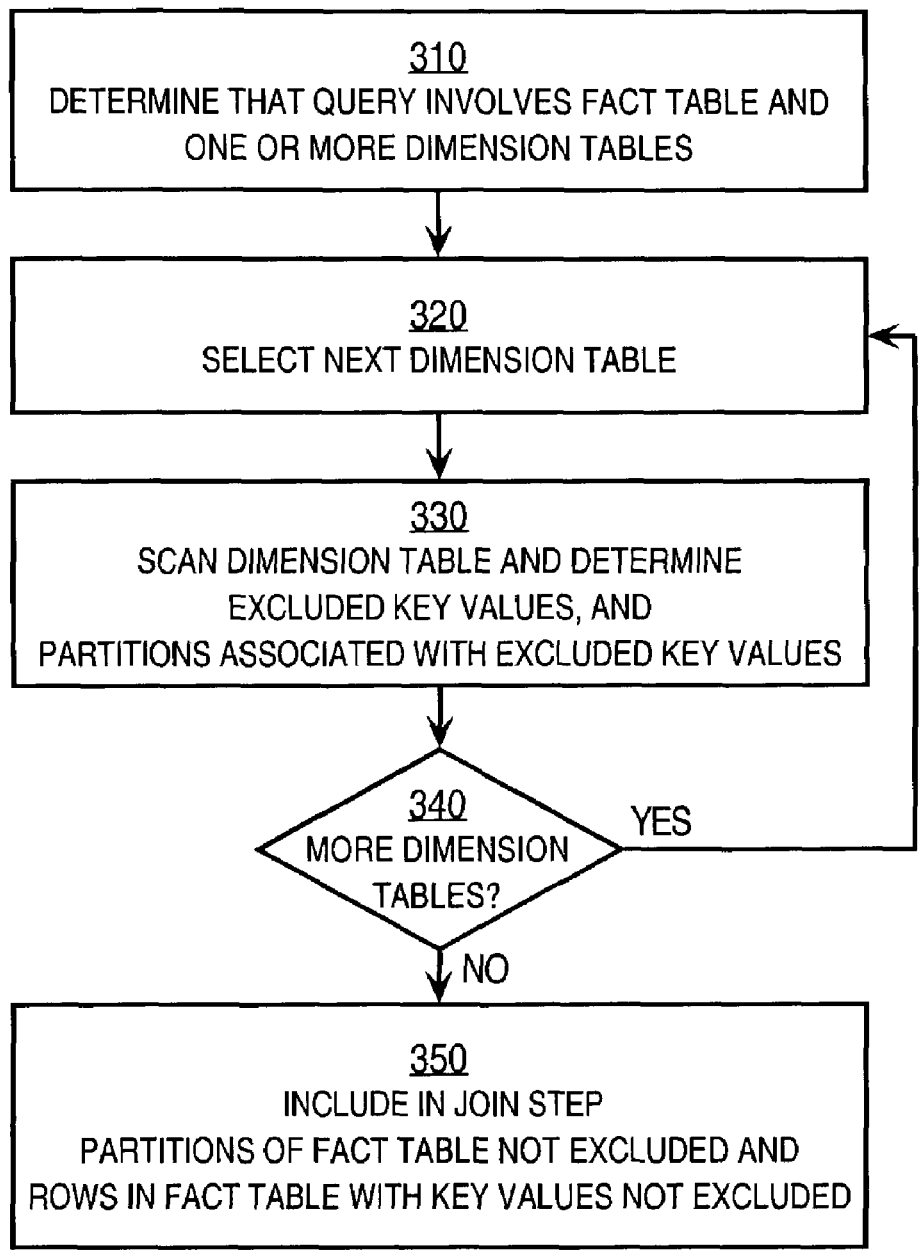
FIG. 3 is a flowchart that illustrates a method for pruning portions of a fact table from join steps of an operation, according to an embodiment.

FIG. 3 is a flowchart that illustrates a method for pruning portions of a fact table from join steps of an operation, according to an embodiment. Although steps are shown in FIG. 3 in a particular order, in other embodiments, steps may be performed in a different order or overlapping in time.

In step 310, the database management system (DBMS) determines that a query involves a fact table and one or more dimension tables. For example, in the illustrated embodiment, the DBMS determines that query SQ1 involves fact table called SALES and three dimension tables called TIME, STORES and PRODUCTS.

In some embodiments, step 310 includes forming a data structure for carrying information about which partitions should be scanned. In other embodiments, the data structure is formed during step 320, described below. The data structure is formed by determining an array of partitions associated with the fact table from a data dictionary that describes the fact table and is maintained by the DBMS. Based on the array of partitions, one or more partition bit vectors are generated. Each partition bit vector has one bit for each partition (where the position of the bit corresponds to the partition). In some embodiments, to save space, a bit can represent more than one partition. A hash function can be used to generate a hash value that indicates a bit position associated with a particular partition. A first value of each bit (e.g., "1") is used to indicate that the corresponding partition (or partitions) has data to be joined for responding to the query; whereas a second value of the bit (e.g., "0") is used to indicate that the corresponding partition (or partitions) has no data used in responding to the query. In some embodiments, the bit values for the partition bit vector are initialized in step 310 to all one value (e.g., all bits are set to "0").

In some embodiments, the steps for the dimension tables (e.g., 210, 220, 212, 222, 214, 224) are carried out in series by a single processor. In such embodiments, a single partition bit vector may be used. In other embodiments, the steps are carried out by multiple slave processes executing on different processors. In such embodiments, a partition bit vector is generated for each slave.

In some embodiments, step 310 includes forming a data structure for carrying information about which scanned rows of the fact table should be filtered out before a join step. In other embodiments, the data structure is formed during step 320, described below. The data structure is formed by determining a number of values associated with the key column or columns of each dimension table from a data dictionary. For a unique key, the number of rows in the dimension table equals the number of unique key values. Based on the number of values, one or more key value bit vectors are generated. Each key value bit vector has one bit for each value of the key in one dimension table (where the position of the bit corresponds to the value of the key). A hash function can be used to generate a hash value that indicates a bit position associated with a particular value (or several values). A first value of each bit (e.g., "1") is used to indicate that rows with the corresponding key value (or values) should be included in the join steps for responding to the query; whereas a second value of the bit (e.g., "0") is used to indicate that the row should not be used in responding to the query. In some embodiments, the bit values for the key value bit vectors are initialized in step 310 to all one value (e.g., all bits are set to "0").

The portion of the fact table indicated by each bit in the key value bit vector is the portion of the fact table having that value of the key in a corresponding set of one or more columns in the fact table. For example, the portion of the SALES table 130 indicated by a bit at a position corresponding to the value "432" in the key value bit vector for the STORES table (in which STORES.store_id is the key column) is made up of the rows in the SALES table 130 having the value "432" in the SALES.store_id column, if any. Though the primary keys of those rows in the SALES table 130 are not known at the time the key value bit vector is generated, the rows can be determined precisely when the rows of the fact table are scanned. The row can be determined by checking the values in the set of columns corresponding to the key.

In some embodiments, each step for the dimension tables (e.g., 210, 220, 212, 222, 214, 224) is carried out in series by a single processor or slave process. In such embodiments, a single key value bit vector may be used for each dimension table. In other embodiments, each step is carried out by multiple slave processes executing on different processors. In such embodiments, a key value bit vector for one dimension table is generated for each slave performing a step for the dimension table.

Figure 4:
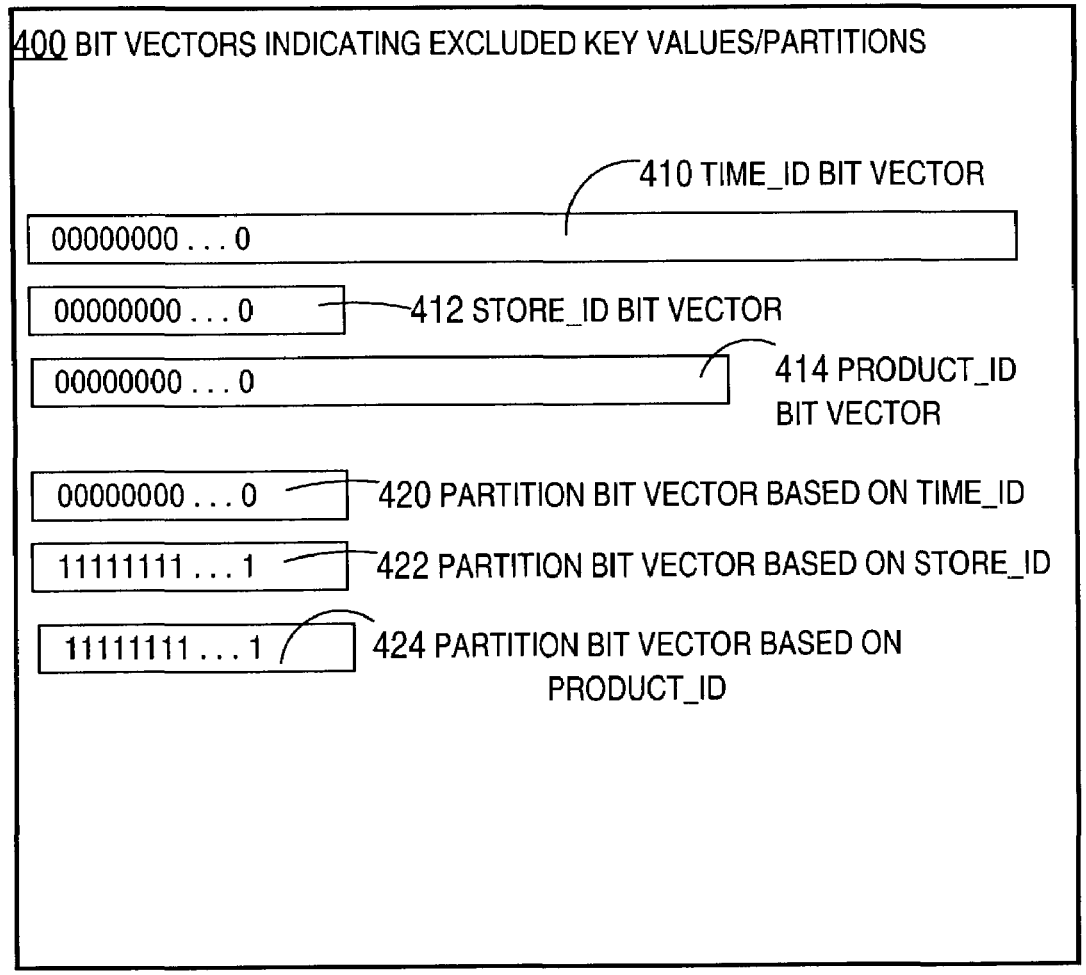
FIG. 4 is a block diagram that illustrates bit vectors used to indicate which portions of the fact table to exclude from join steps of the operation, according to an embodiment.

FIG. 4 is a block diagram that illustrates bit vectors 400 used to indicate which portions of the fact table to exclude from join steps of the operation, according to the illustrated embodiment. Key value bit vector 410 holds bits corresponding to values of the key column time_id in the TIME table 140. Key value bit vector 412 holds bits corresponding to values of the key column store_id in the STORES table 110. Key value bit vector 414 holds bits corresponding to values of the key column prod_id in the PRODUCTS table 120. It is assumed for purposes of illustration, that the bits are initialized to zero, indicating no values are used by the query and therefore every row of every partition should be filtered out.

Partition bit vector 420 holds bits corresponding to partitions of the fact table that are set based on values of time_id in the TIME table 140. Partition bit vector 422 holds bits corresponding to partitions of the fact table that are set based on values of store_id in the STORES table 110. Partition bit vector 424 holds bits corresponding to partitions of the fact table that are set based on values of prod_id in the PRODUCTS table 120. In the illustrated example, the fact table, SALES, is partitioned only by time_id, so that the dimension tables STORES and PRODUCTS do not affect the partitioning; and partition bit vectors 422, 424 can be omitted. For example, space for bit vectors 422, 424 need not be allocated and nothing needs to be initialized. It is assumed for purposes of illustration, that the bits in partition bit vector 420 are initialized to zero (0), indicating no values are used by the query and therefore every partition should not be scanned; that the partition bit vectors 422, 424 are not omitted; and that the bits in partition bit vectors 422, 424 are initialized to one (1) indicating that these dimension tables do not prune any partitions of the fact table.

In embodiments in which the fact table is not partitioned, partition bit vectors 420, 422, 424 may be omitted. In embodiments with a partitioned fact table, but no filtering out of scanned rows, key value bit vectors 410, 412, 414 may be omitted.

In step 320, the next dimension table is selected for processing. The first time step 320 is performed, the first dimension table is selected. The dimension tables can be selected in any order. In the illustrated embodiment, the dimension tables are selected in order of D1, D2, D3. Therefore, in the illustrated embodiment, the tables are selected in the order of TIME table 140, STORES table 110, PRODUCTS table 120. In some embodiments, the partition bit vectors, or the key value bit vectors, or both, are formed for the selected dimension table and initialized during step 320.

In step 330 the selected dimension table is scanned (e.g., in one of steps 210, 212, 214 of FIG. 2) and prepared for a join in a build or sort step (e.g., in one of steps 220, 222, 224 of FIG. 2). As each row is processed, either before or after the build/sort step, it is determined which values of the key are to be excluded from the joins, e.g., which values are to remain excluded if its bit vector is initialized to be excluded. If partitions are to be pruned, it is also determined which partitions are to be excluded, e.g., which partitions are to remain excluded if its bit vector is initialized to be excluded.

In the illustrated embodiments, during step 330, the conditions from the query, which apply to the selected dimension table but are not among the join conditions, are tested for the row being processed. If the row satisfies the condition, then the value of the key for that row, and any partition associated with that value, are to be included in the joins. If the row does not satisfy the condition, then the value of the key for that row should be excluded from the joins. A partition associated with the value of the key should not be excluded unless all values of the key associated with the partition are also excluded. If there is a one-to-one correspondence between the key value and a partition, then the partition can be excluded when the value of the key is excluded. This information is then stored for use during processing of the fact table in steps 230 or 232 of FIG. 2, or both.

For example, in the illustrated embodiment, the bits of the bit vectors are initialized to zero, and if a row satisfies the conditions of the query, then the bit that corresponds to the value of the key column in the key value bit vector for the selected dimension table is set to one (1) to indicate that rows of the fact table with that key value should be included in the joins, and not filtered out. The partition, if any, associated with that value of the key should not be pruned. Therefore the bit that corresponds to the associated partition in the partition bit vector for the selected dimension table is also set to one (1) to indicate that the partition should be selected and scanned for performing the joins. If a row does not satisfy the query, the bit vectors are left unchanged.

In another embodiment, the bits of the bit vectors are initialized to one; and the bit vectors are unchanged if a row satisfies the conditions of the query. If the row does not satisfy the conditions of the query, then the bit that corresponds to the value of the key column in the key value bit vector for the selected dimension table is set to zero (0) to indicate that rows of the fact table with that key value should not be included in the joins, and should be filtered out. The partition, if any, associated with that value of the key should not be pruned until it is determined that all the key values associated with the partition are set to zero. At that time, the bit that corresponds to the associated partition in the partition bit vector for the selected dimension table is also set to zero (0) to indicate that the partition should not be selected and scanned for performing the joins.

There is some computational cost in testing the conditions of the query against every row of the dimension table and finding the partition associated with the key value. Therefore, in some embodiments, step 330 includes determining whether all the partitions of the fact table have been indicated as included. For example, in embodiments initialized with zeroes in the partition bit vector, it is determined whether all the bits are set to one (1). If so, then the step of using a value of the key to find an associated partition is suspended, saving some computational costs. In embodiments that do not filter out rows within a scanned partition, the testing of the query conditions is also suspended, saving even more computational costs.

In step 340, it is determined whether there remain any dimension tables in the query that remain to be selected. If so, control passes back to step 320. If not, control passes to step 350. Steps 320, 330, 340 represent a loop over all dimension tables involved in the query, and can be performed in any manner known in the art.

In step 350 the information gathered in step 330 is used to prune the fact table by not scanning one or more partitions (in step 230 of FIG. 2), or by filtering out some scanned rows (in step 232 of FIG. 2) to keep those rows out of row set 280, or both.

For example, the partition bit vectors, if any, are used in step 230 to prune one or more partitions that correspond to positions in the bit vector with a value of zero. If the fact table is sub-partitioned based one or more other keys in corresponding other dimension tables, the partition bit vectors are combined in some embodiments. For example, in bit vectors that use a zero to indicate an excluded partition, the partition bit vectors are combined with a bitwise AND operation. In other embodiments, step 230 includes a separate partition iterator for sub-partitions. In such embodiments, the bit vector for a dimension used as a sub-partition is kept separate from the bit vectors for the dimensions used in other levels of the partitioning, and the bit vector is used alone by the iterator for the corresponding sub-partition.

The key value bit vectors, if any, are used in step 232 to filter out rows that have key values that correspond to positions in the key value bit vector with a value of zero (0). If multiple dimension tables have non-join conditions to satisfy, multiple key value bit vectors may be produced. A row is filtered out if it is indicated as filtered out by even one of the multiple key value bit vectors.

If multiple slave processes process the rows of one dimension table, such as during parallel processing, then several key value bit vectors are produced for the same dimension table. For example, there would be multiple bit vectors of type 410 in FIG. 4. The multiple key value bit vectors for each dimension table would be combined. For example, in bit vectors that use a zero to indicate an excluded key value, the key value bit vectors are combined with a bitwise OR operation, represented herein by the symbol "∥".

The information produced in steps 330 can be transferred to step 350 in any manner known in the art. In some embodiments, the bit vectors are placed in memory shared by the processors. In some embodiments, the bit vectors are passed as arguments in a procedure call. In some embodiments, the bit vectors are broadcast by the processes that produce them. In some embodiments, the process performing step 350 requests the bitmaps from the other processes, either at the start of step 350 or, lazily, e.g., as needed.

There is some computational cost in performing the filtering based on the key value bit vector. The cost might not exceed the benefit unless a substantial number of rows are pruned from the row source sent to the first join step. Therefore, in some embodiments, step 350 includes determining the percentage of rows pruned after a certain number of rows have been scanned. For example, the percentage of rows pruned is determined based on the first 100 or 1000 rows scanned. If the percentage is below a predefined threshold, e.g., 2%, then filtering is suspended and all rows subsequently scanned are automatically included in the row source passed to the join.

Partition Pruning

The use of method 300 for partition pruning is further described using the example tables of the illustrated embodiment and star query SQ1.

In step 310, the star query SQ1 is received and the execution plan diagrammed in FIG. 2 is generated by the DBMS, where dimension table D1 is TIME table 140, dimension table D2 is STORES table 110, and dimension table D3 is PRODUCTS table 120. For purposes of illustration, it is assumed that the execution plan calls for all hash joins. Therefore steps 220, 222, 224 are build steps for building a hash table, and join steps 240, 242, 244 are hash table probe steps.

In step 320, the TIME table 140 is selected and bit vector 420 is generated and initialized with zeroes, as depicted in FIG. 4. If row pruning is also performed, as described in the next section, bit vector 410 is also generated and initialized with zeroes.

In step 330, the rows of the TIME table 140 are scanned and used to build a first hash table. During step 330, the DBMS also evaluates the non-join conditions from the star query SQ1, which involve the TIME table 140. These conditions are designated herein as NJC 1:

t.date BETWEEN "Nov. 13, 2001" AND "Nov. 22, 2001" (NJC1)

For example, row 142a of TIME table 140 has a value of t.date equal to "Nov. 15, 2001" so that NJC1 evaluates to "true." Row 142b has a value of t.date equal to "Dec. 17, 2001" so that NJC1 evaluates to "false." Based on these values, the bits in partition bit vector 420 are determined. If row pruning is also performed, as described in the next section, bits in key value bit vector 410 are also determined.

When a row of the dimension table evaluates to true, rows of the fact table that join with this row can possibly be included in the output. The value of the key column is determined to help identify any rows and partitions that are joined with this row. If the key column is also a partitioning key, the partition associated with the value of the key column is determined. The bit in the partition bit vector corresponding to the associated partition is changed to 1, indicating the partition should not be pruned. If that partition is sub-partitioned the bits corresponding to all the sub-partitions are set to 1 in some embodiments. As far as the dimension table is concerned, data from any of those partitions can be included in the output and those partitions should not be pruned. Some of those sub-partitions may be pruned as a result of conditions on another dimension table involved in the sub-partitioning. In some embodiments, a mapping is maintained by the database between values of the key column used as a partitioning key and the associated partitions. If row pruning is also performed, as described in the next section, a bit in the key value bit vector associated with the value of the key column is also set to one (1).

When a row of the dimension table evaluates to false, rows of the fact table that join with this row cannot possibly be included in the output. The row offers no reason to scan a partition that is defined to hold it. Therefore, the zero values in the bit vectors associated with this key value and associated partition are not changed. If another row offers a reason to scan this partition, by evaluating to true, that other row will cause the partition bit to be reset to one (1), as described above.

For row 142a that evaluates to "true," the value of the key column, the TIME.time_id column 141, is "1050." It is assumed for purposes of illustration that a mapping function map_to_part is maintained by the DBMS to output a list of partitions associated with a time_id value of 1050. Using the map_to_part function, the partition associated with time_id 1050 is determined to be partition 151 and no other partitions. Therefore the bit in partition bit vector 420 associated with partition 151 is changed to one (1), indicating the partition should not be pruned. If row pruning is also performed, as described in the next section, a bit in the key value bit vector 410 associated with the value of "1050" is also set to one (1).

For row 142b, which evaluates to "false," no change is made to the partition bit vector 420. Even if row pruning is also performed, as described in the next section, no change is made to the key value bit vector 410. After processing all the rows in the TIME table, the partition bit vector 420 is set. Control passes to step 340 to loop over the dimension tables involved in the query.

Although not shown in TIME table 140, it is assumed for purposes of illustration that the row with a time_id value of "1051" also evaluates to "true," and maps to partition 152. Therefore the bit in partition bit vector 420 associated with partition 152 is changed to one (1), indicating the partition should not be pruned.

For purposes of illustration, it is assumed that the number of partitions in the SALES table is less than the number of values for the time_id column (recall that time_id values are hashed to produce hash values that indicate partitions, so that multiple time_id values may be hashed to the same partition). Table 1 shows some example contents for partition bit vectors 420, 422, 424 after processing the TIME table 140. The contents shown include partitions 151, 152, 153. Bit vectors 422, 424 have not yet been defined.

TABLE 1

Example contents of partition bit vectors after processing the TIME table.

| partition bit vector | Bits for partitions 151, 152, 153 |
| --- | --- |
| 420 (TIME) | . . . 110 . . . |
| 422 (STORES) | not defined |
| 424 (PRODUCTS) | not defined |

Returning to step 320, the STORES table 110 is selected and partition bit vector 422 is generated and initialized with ones, as depicted in FIG. 4. According to the illustrated embodiment, the partition bit vector is initialized to ones because the SALES table is not partitioned on values of the STORES columns. As described above, in other embodiments no partition bit vector for STORES is even generated. If row pruning is also performed, as described in the next section, bit vector 412 is also generated and is initialized with zeroes.

In step 330, the rows of the STORES table 110 are scanned and used to build a first hash table. During step 330, the DBMS determines that the partition bit vector 422 based on the STORES table data is already all ones, so it skips trying to determine which rows of the STORES table are excluded or included in the output of the star query SQ1, unless the row pruning is also to be performed. The details of step 330 for row pruning with rows from the STORES table are described in the next section.

Table 2 shows example contents for partition bit vectors 420, 422, 424 that includes partitions 151, 152, 153 after processing the STORES table 110. Partition bit vectors 424 has not yet been defined. Control passes to step 340 to loop over the dimension tables involved in the query.

TABLE 2

Example contents of partition bit vectors after processing the STORES table.

| partition bit vector | Bits for partitions 151, 152, 153 |
|---|---|
| 420 (TIME) | . . . 110 . . . |
| 422 (STORES) | . . . 111 . . . |
| 424 (PRODUCTS) | not defined |

Returning to step 320, the PRODUCTS table 110 is selected and partition bit vector 424 is generated and initialized with ones, as depicted in FIG. 4. The partition bit vector is initialized to ones because the SALES table is not partitioned on values of the PRODUCTS columns. If row pruning is also performed, as described in the next section, bit vector 414 is also generated and is initialized with zeroes.

In step 330, the rows of the PRODUCTS table 120 are scanned and used to build a first hash table. During step 330, the DBMS determines that the partition bit vector 424 based on the PRODUCTS table data is already all ones, so it skips trying to determine which rows of the PRODUCTS table are excluded or included in the output of the star query SQ1, unless the row pruning is also to be performed. The details of step 330 for row pruning based on the PRODUCTS table are described in the next section.

Table 3 shows some example contents for partition bit vectors 420, 422, 424 that includes partitions 151, 152, 153 after processing the PRODUCTS table 120. All three partition bit vectors 424 have been defined. Control passes to step 340 to end the loop over the dimension tables involved in the query.

TABLE 3

Example contents of partition bit vectors after processing the PRODUCTS table.

| partition bit vector | Bits for partitions 151, 152, 153 |
|---|---|
| 420 (TIME) | . . . 110 . . . |
| 422 (STORES) | . . . 111 . . . |
| 424 (PRODUCTS) | . . . 111 . . . |

Control then passes to step 350 to include partitions of the fact table that are not indicated to be excluded in any of the partition bit vectors 420, 422, 424. As described above, a bitwise AND is performed among the three partition bit vectors. After performing the bitwise AND, the result for the three partitions 151, 152, 153 is "110." Therefore partitions 151 and 152 are included in the iterations performed in step 230, and scanned in turn, during step 232. However, partition 153 is excluded and is not scanned. No value of time_id was found, which both maps to partition 153 and also satisfies NJC1.

For the illustrated example, it is expected that most rows of the TIME table 140 have dates that do not satisfy NJC1, and therefore that most values of the time_id column map to partitions that are pruned from the table scan. Substantial savings in computational resources accrue as a result of pruning over half of the partitions from the table scan.

Row Pruning

The use of method 300 for row pruning is further described using the example tables of the illustrated embodiment and star query SQ1.

Steps 310, 320 and the first pass through step 330 are as described above. In addition, during step 330, for every row of the TIME table, which evaluates to true, the bit in the key value bit vector associated with the value of the key column is set to one (1). For purposes of illustration it is assumed that the bit in the Nth position is associated with a particular value of time_id. The bit in the Nth position is obtained from a particular hash function represented by the symbol Htime which yields a hash value that is $2^N$ when the particular value of time_id is input to the hash function Htime. The bit is set to the value of one (1) in any manner known in the art. For example, the bit is set to one (1) for the current value of time_id using a bitwise OR, represented by the symbol "||", as described in an assignment of the form of Equation E1.

$$\text{bit vector } 410 = (\text{bit vector } 410 \| \text{Htime(TIME.time\_id))} \quad (E1)$$

In other embodiments other methods can be used, for example, a value of 1 can be shifted N times, so that the bit vector value can be set using an assignment of the form of Equation E2.

$$\text{bit vector } 410 = (\text{bit vector } 410 \| \text{Shift}(1,N)) \quad (E2)$$

Table 4 shows some example contents for key value bit vector 410, which include bits representing key values 1050, 1051, and 1082 after processing the TIME table 140. Control passes to step 340 to loop over the dimension tables involved in the query.

TABLE 4

Example contents of key value bit vectors after processing the TIME table.

| key value bit vector | Bits for values 1050, 1051 . . . 1082 |
|---|---|
| 410 (TIME) | . . . 11 . . . 0 . . . |

Returning to step 320, the STORES table 110 is selected and key value bit vector 412 is generated and is initialized with zeroes.

Returning to 330, as described above, the rows of the STORES table 110 are scanned and used to build a second hash table. To do row pruning during step 330, the DBMS evaluates the non-join conditions that involve the STORES table 110, designated herein as NJC2, which is:

$$\text{s.state="CA"} \quad (NJC2)$$

For example, row 112a of STORES table 110 has a value of s.state equal to "CA" so that NJC2 evaluates to "true." Row 112b has a value of s.state equal to "IN" so that NJC2 evaluates to "false." Based on these values, the bits in key value bit vector 412 are determined.

For every row of the STORES table, which evaluates to true, the bit in the key value bit vector 412, which bit is associated with the value of the key column, is set to one (1). The key column of the STORES table 110 is the store_id column 111. The value in the store_id column 111 for row 112a that evaluates to "true" is "23." Therefore, the bit in the key value bit vector 412 associated with the value "23" is set to one (1). For every row of the STORES table, which evaluates to false, no change is made to the key value bit vector, because the bit for that value has been initialized to zero (0).

Table 5 shows some example contents for the key value bit vector 412, which include bits representing key values 23, 156 and 432 after processing the STORES table 110. For purposes of illustration, it is assumed that a row with a store_id value of "156" evaluates to "true" in NJC2. Control passes to step 340 to loop over the dimension tables involved in the query.

TABLE 5

Example contents of key value bit vectors after processing the STORES table.

| key value bit vector | Bits for values 23 . . . 156 . . . 432 |
|---|---|
| 412 (STORES) | . . . 1 . . . 1 . . . 0 . . . |

Returning to step 320, the PRODUCTS table 120 is selected and key value bit vector 414 is generated and initialized with zeroes.

Returning to 330, the rows of the PRODUCTS table 120 are scanned and used to build a third hash table, as described above for partition pruning. To do row pruning during step 330, the DBMS evaluates the non-join conditions that involve the PRODUCTS table 120, designated herein as NJC3, which is:

p.category="MEMORY" (NJC3)

For example, row 122a of PRODUCTS table 120 has a value of p.category equal to "MEMORY" so that NJC3 evaluates to "true." Row 122b has a value of p.category equal to "MODEM" so that NJC3 evaluates to "false." Based on these values, the bits in key value bit vector 414 are determined.

For every row of the PRODUCTS table, which evaluates to true, the bit in the key value bit vector 414, which bit is associated with the value of the key column, is set to one (1). The key column of the PRODUCTS table 110 is the prod_id column 121. The value in the prod_id column 121 for row 122a that evaluates to "true" is "117." Therefore, the bit in the key value bit vector 414 associated with the value "117" is set to one (1). For purposes of illustration, it is assumed that the bit position associated with a value of prod_id is the same as the value of the prod_id. For every row of the PRODUCTS table, which evaluates to false, no change is made to the key value bit vector, because the bit for that value has been initialized to zero (0).

Table 6 shows some example contents for the key value bit vector 414, which include bits representing key values 117, 98 and 589 after processing the PRODUCTS table 120. For purposes of illustration, it is assumed that a row with a prod_id value of "98" evaluates to "false" in NJC3. Control passes to step 340 to end the loop over the dimension tables involved in the query.

TABLE 6

Example contents of key value bit vectors after processing the PRODUCTS table.

| key value bit vector | Bits for values 98 . . . 117 . . . 589 |
|---|---|
| 414 (PRODUCTS) | . . . 0 . . . 1 . . . 0 . . . |

Control then passes to step 350 to filter out rows of the fact table that are indicated to be excluded in any of the key value bit vectors 410, 412, 414. The indication is indirect, coming through values of the keys associated with the three dimension tables. Each row of the included partitions is scanned and subjected to comparisons with the key value bit vectors.

As described above, only partitions 151 and 152 are included in the iterations performed in step 230, and scanned in turn, during step 232. As shown in FIG. 1B, while scanning partition 151, rows 132a, 132b of the SALES table 130a are scanned, among others (not shown). While scanning partition 152, row 132c of the SALES table 130a is scanned, among others (not shown).

After row 132a is scanned, the DBMS compares the values of the columns that are used as keys in the dimension tables TIME, STORES, PRODUCTS to the corresponding key value bit vectors. The columns that contain values of keys for other tables are called foreign key columns. The foreign key columns in the SALES table for the dimension tables involved in the star query SQ1 are the f.store_id column 133, the f.prod_id column 135 and the f.time_id column 137.

The values in these foreign key columns are compared to corresponding key value bit vectors. The value in the f.store_id column is compared to the store_id key value bit vector 412, the value in the f.prod_id column is compared to the $prod_{id}$ key value bit vector 414, and the value in the f.time_id column is compared to the time_id key value bit vector 410. If none of these key value bit vectors indicate the values in the foreign key columns of the SALES table are excluded, the row is passed in the row set 280 to the hash join probe step 240. If any of these key value bit vectors indicate even one of the values in the foreign key columns of the SALES table is excluded, the row is filtered out, and not included in row set 280.

The value of the bit associated with the value of f.time_id for the current row of the sales table is given by expression: bit vector 410 AND Htime(f.time_id). If this value is zero, the row should be filtered out of row set 280. The value of the bit associated with the value of f.store_id for the current row of the sales table is given by the expression: bit vector 412 AND Shift(1,f.store_id). If this value is zero, the row should be filtered out of row set 280. The value of the bit associated with the value of f.prod_id for the current row of the sales table is given by the expression: bit vector 414 AND Shift(1, f.prod_id). If this value is zero, the row should be filtered out of row set 280. The bits associated with each of the foreign key values are compared with a bitwise AND to determine if the row is included or filtered out. If the three bits AND to a value of one (1), then the row is included in row set 280. If the bits AND to a value of zero (0), then the row is filtered out. The bits AND to a value of zero (0), if any of the bits is zero.

Table 7, gives the values of the associated bits for the foreign key values in rows 132a, 132b, 132c and gives the result of the bitwise AND.

TABLE 7

Example values of the associated bits in the key value bit vectors for the foreign keys in three rows scanned from the SALES table.

| SALES Row | 132a | 132b | 132c |
|---|---|---|---|
| f.time_id | 1050 | 1050 | 1051 |
| associated bit = bit vector 410 AND Htime(f.time_id) | 1 | 1 | 1 |
| f.store_id | 23 | 23 | 432 |
| associated bit = bit vector 412 AND Shift(1,f.store_id) | 1 | 1 | 0 |
| f.prod_id | 117 | 589 | 117 |
| associated bit = bit vector 414 AND Shift(1,f.prod_id) | 1 | 0 | 1 |
| Result of AND for all three bits associated with row of SALES | 1 | 0 | 0 |
| Row included or filtered out? | included | filtered out | filtered out |

As shown in table 7, row 132a is included in row set 280; however, rows 132b and 132c are filtered out. Thus, in the first three rows scanned, 67% are filtered out. If this ratio is maintained for the first 100 rows scanned, then the DBMS will continue with the filtering because the 67% filtered out would be greater than the pre-determined percentage of 2%.

For the illustrated example, it is expected that most rows of the SALES table 130 that are scanned in will be filtered out. Substantial savings in computational resources accrue as a result of pruning so many rows from the row set 280.

Hardware Overview

Figure 5:
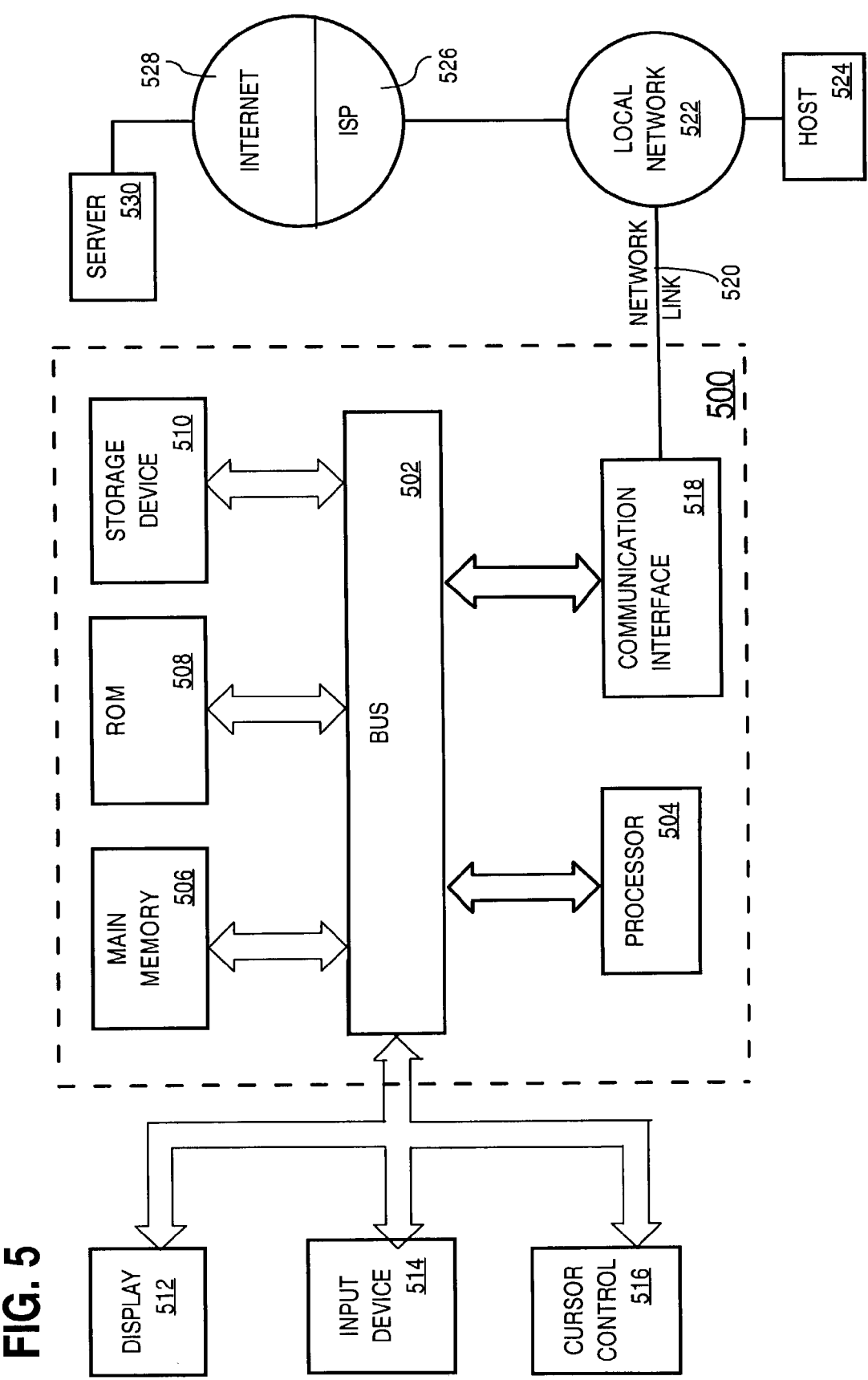
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing an operation that joins a plurality of data objects, the method comprising the computer implement steps of:
    determining that the operation joins a first data object and a second data object, wherein the second data object includes a plurality of portions;
    scanning each data unit of the first data object, wherein the first data object includes a plurality of data units;
    after scanning each data unit of the first data object, generating first information based on data in the plurality of data units of the first data object, wherein the first information indicates for exclusion a portion of the second data object, which portion is excluded from an output of the operation; and
    including, in a particular join step involving the second data object, only one or more portions of the second data object which are not indicated for exclusion in the first information.

2. The method of claim 1, wherein:
    the plurality of portions are a plurality of partitions of the second data object;
    the plurality of partitions are stored separately from each other; and
    said step of including only one or more portions comprises scanning only one or more partitions.

3. The method of claim 1, wherein:
    a portion of the plurality of portions is a data unit of the second data object; and
    said step of including only one or more portions comprises filtering out a portion of the second data object indicated for exclusion in the first information before performing the particular join step.

4. The method of claim 1, wherein:
    the method further comprises:
    determining that the operation involves a third data object;
    scanning each data unit of a plurality of data units of the third data object; and
    based on data in the plurality of data units of the third data object, generating second information indicating for exclusion a portion of the second data object, which portion is excluded from an output of the operation; and
    said step of including in the particular join step only one or more portions of the second data object which are not indicated for exclusion in the first information further comprises including in the particular join step only one or more portions of the second data object which are not indicated for exclusion in either the first information or the second information.

5. The method of claim 1, said step of generating the first information further comprising forming a bit vector in which each bit position represents one different portion of the plurality of portions of the second data object and in which a particular value at any bit position indicates a corresponding portion is excluded from the output of the operation.

6. The method of claim 5, wherein the particular value is zero.

7. The method of claim 1, wherein the data objects are database tables and the data units are rows of a database table.

8. The method of claim 1, wherein:
    the method further comprises determining a plurality of slave processes for scanning all the data units of the first data object;
    said step of scanning further comprises each slave process of the plurality of slave processes scanning a corresponding different subset of the plurality of data units of the first data object; and
    said step of generating the first information further comprises each slave process of the plurality of slave processes determining which portion of the second data object is excluded from a join with any data unit in the corresponding different subset.

9. The method of claim 4, wherein:
    the method further comprises determining a plurality of slave processes for scanning data units of the plurality of data objects;
    said step of scanning the first data object further comprises a first slave process of the plurality of slave processes scanning each data unit of the plurality of data units of the first data object; and
    said step of scanning the third data object further comprises a second slave process of the plurality of slave processes scanning each data unit of the plurality of data units of the third data object.

10. The method of claim 1, wherein each data unit of the plurality of data units of the first data object includes a value of a key parameter used to identify one portion of the plurality of portions of the second data object.

11. The method of claim 10, further comprising maintaining a mapping between values of the key parameter and the plurality of portions of the second data object.

12. The method of claim 10, said step of generating the first information further comprising determining whether a particular data unit of the plurality of data units of the first data object is excluded from the output of the operation.

13. The method of claim 12, said step of generating the first information further comprising, if it is determined that the particular data unit is not excluded from the operation, then performing the steps of:
  determining a particular portion of the plurality of portions of the second data object based on the value of the key parameter for the particular data unit; and
  changing in the first information any data that indicates the particular portion is excluded from the join so that the particular portion is not excluded form the join.

14. The method of claim 13, said step of determining that the operation joins the first data object and the second data object further comprising initializing the first information with data indicating the plurality of portions are excluded from the join.

15. The method of claim 12, said step of generating the first information further comprising, if it is determined that the particular data unit is excluded from the operation, then performing the steps of:
  determining a particular portion of the plurality of portions of the second data object based on the value of the key parameter for the particular data unit; and
  inserting in the first information data that indicates the particular portion is excluded from the join.

16. The method of claim 15, said step of determining that the operation joins the first data object and the second data object further comprising initializing the first information with data indicating the plurality of portions are included in the join.

17. The method of claim 1, said step of including only one or more portions further comprising:
  determining whether the first information indicates no portion of the plurality of portions of the second data object is excluded, and
  if it is determined that no portion is excluded, then including all portions of the plurality of portions of the second data object in the particular join step.

18. The method of claim 3, said step of including only one or more portions further comprising, before completing the particular join step, performing the steps of:
  determining whether an actual percentage of data units filtered out is less than a target percentage; and
  if it is determined that the actual percentage is less than the target percentage, then including all data units remaining in the second data object.

19. The method of claim 18, further comprising determining the target percentage associated with a performance benefit that exceeds a performance cost for performing said step of filtering out a data unit indicated in the first information.

20. A computer-readable medium carrying one or more sequences of instructions for performing an operation that joins a plurality of data objects, wherein execution of the one or more sequences of instructions by one or more processors causes the one or more processors to perform the steps of:
  determining that the operation joins a first data object and a second data object, wherein the second data object includes a plurality of portions;
  scanning each data unit of the first data object, wherein the first data object includes a plurality of data units;
  after scanning each data unit of the first data object, generating first information based on data in the plurality of data units of the first data object, wherein the first information indicates for exclusion a portion of the second data object, which portion is excluded from an output of the operation; and
  including, in a particular join step involving the second data object, only one or more portions of the second data object which are not indicated for exclusion in the first information.

21. The computer-readable medium of claim 20, wherein:
  the plurality of portions are a plurality of partitions of the second data object;
  the plurality of partitions are stored separately from each other; and
  said step of including only one or more portions comprises scanning only one or more partitions.

22. The computer-readable medium of claim 20, wherein:
  a portion of the plurality of portions is a data unit of the second data object; and
  said step of including only one or more portions comprises filtering out a data unit portion of the second data object indicated for exclusion in the first information before performing the particular join step.

23. The computer-readable medium of claim 20, wherein:
  execution of the one or more sequences of instructions by the one or more processors further causes the one or more processors to perform the steps of:
    determining that the operation involves a third data object;
    scanning each data unit of a plurality of data units of the third data object; and
    based on data in the plurality of data units of the third data object, generating second information indicating for exclusion a portion of the second data object, which portion is excluded from an output of the operation; and
  said step of including in the particular join step only one or more portions of the second data object which are not indicated for exclusion in the first information further comprises including in the particular join step only one or more portions of the second data object which are not indicated for exclusion in either the first information or the second information.

24. The computer-readable medium of claim 20, said step of generating the first information further comprising forming a bit vector in which each bit position represents one different portion of the plurality of portions of the second data object and in which a particular value at any bit position indicates a corresponding portion is excluded from the output of the operation.

25. The computer-readable medium of claim 24, wherein the particular value is zero.

26. The computer-readable medium of claim 20, wherein the data objects are database tables and the data units are rows of a database table.

27. The computer-readable medium of claim 20, wherein:
  execution of the one or more sequences of instructions by the one or more processors further causes the one or more processors to perform the step of determining a plurality of slave processes for scanning all the data units of the first data object;
  said step of scanning further comprises each slave process of the plurality of slave processes scanning a corresponding different subset of the plurality of data units of the first data object; and
  said step of generating the first information further comprises each slave process of the plurality of slave processes determining which portion of the second data object is excluded from a join with any data unit in the corresponding different subset.

28. The computer-readable medium of claim 23, wherein:
execution of the one or more sequences of instructions by the one or more processors further causes the one or more processors to perform the step of determining a plurality of slave processes for scanning data units of the plurality of data objects;
said step of scanning the first data object further comprises a first slave process of the plurality of slave processes scanning each data unit of the plurality of data units of the first data object; and
said step of scanning the third data object further comprises a second slave process of the plurality of slave processes scanning each data unit of the plurality of data units of the third data object.

29. The computer-readable medium of claim 20, wherein each data unit of the plurality of data units of the first data object includes a value of a key parameter used to identify one portion of the plurality of portions of the second data object.

30. The computer-readable medium of claim 29, wherein execution of the one or more sequences of instructions by the one or more processors further causes the one or more processors to perform the step of maintaining a mapping between values of the key parameter and the plurality of portions of the second data object.

31. The computer-readable medium of claim 29, said step of generating the first information further comprising determining whether a particular data unit of the plurality of data units of the first data object is excluded from the output of the operation.

32. The computer-readable medium of claim 31, said step of generating the first information further comprising, if it is determined that the particular data unit is not excluded from the operation, then performing the steps of:
determining a particular portion of the plurality of portions of the second data object based on the value of the key parameter for the particular data unit; and
changing in the first information any data that indicates the particular portion is excluded from the join so that the particular portion is not excluded form the join.

33. The computer-readable medium of claim 32, said step of determining that the operation joins the first data object and the second data object further comprising initializing the first information with data indicating the plurality of portions are excluded from the join.

34. The computer-readable medium of claim 31, said step of generating the first information further comprising, if it is determined that the particular data unit is excluded from the operation, then performing the steps of:
determining a particular portion of the plurality of portions of the second data object based on the value of the key parameter for the particular data unit; and
inserting in the first information data that indicates the particular portion is excluded from the join.

35. The computer-readable medium of claim 34, said step of determining that the operation joins the first data object and the second data object further comprising initializing the first information with data indicating the plurality of portions are included in the join.

36. The computer-readable medium of claim 20, said step of including only one or more portions further comprising:
determining whether the first information indicates no portion of the plurality of portions of the second data object is excluded, and
if it is determined that no portion is excluded, then including all portions of the plurality of portions of the second data object in the particular join step.

37. The computer-readable medium of claim 22, said step of including only one or more portions further comprising, before completing the particular join step, performing the steps of:
determining whether an actual percentage of data units filtered out is less than a target percentage; and
if it is determined that the actual percentage is less than the target percentage, then including all data units remaining in the second data object.

38. The computer-readable medium of claim 37, further comprising determining the target percentage associated with a performance benefit that exceeds a performance cost for performing said step of filtering out a data unit indicated in the first information.

* * * * *

UNITED STATES PATENT AND TRADEMARK OFFICE
CERTIFICATE OF CORRECTION

| | | |
|---|---|---|
| PATENT NO. | : 7,020,661 B1 | Page 1 of 1 |
| APPLICATION NO. | : 10/193620 | |
| DATED | : March 26, 2006 | |
| INVENTOR(S) | : Thierry Cruanes et al. | |

It is certified that error appears in the above-identified patent and that said Letters Patent is hereby corrected as shown below:

Column 26,
Line 16, delete "data unit".

Signed and Sealed this

Twentieth Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,020,661 B1 | Page 1 of 1 |
| APPLICATION NO. | : 10/193620 | |
| DATED | : March 28, 2006 | |
| INVENTOR(S) | : Thierry Cruanes et al. | |

It is certified that error appears in the above-identified patent and that said Letters Patent is hereby corrected as shown below:

Column 26,
Line 16, delete "data unit".

This certificate supersedes certificate of correction issued June 20, 2006.

Signed and Sealed this

Twenty-ninth Day of August, 2006

JON W. DUDAS
*Director of the United States Patent and Trademark Office*